Figure 1:
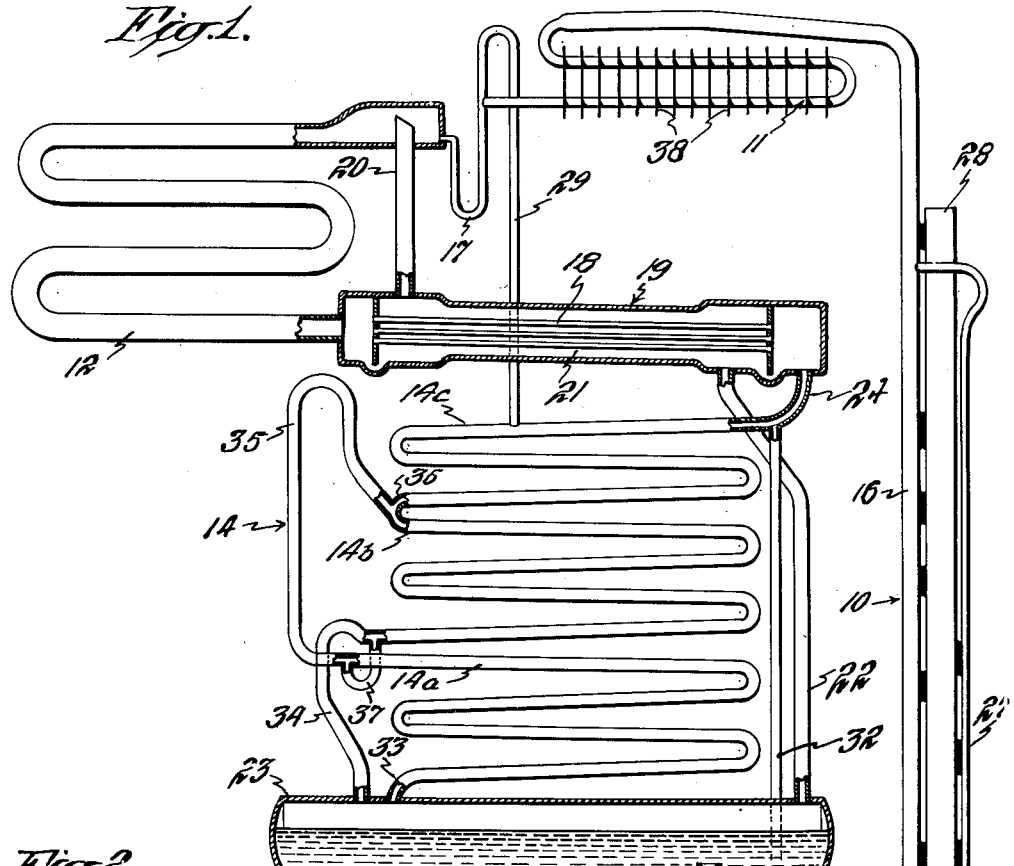

July 24, 1951  A. G. HELLSTROM  2,561,369

ABSORPTION REFRIGERATION SYSTEM

Filed Feb. 26, 1948

INVENTOR.
Axel Gösta Hellstrom
BY
his ATTORNEY

Patented July 24, 1951

2,561,369

UNITED STATES PATENT OFFICE 2,561,369

ABSORPTION REFRIGERATION SYSTEM

Axel Gosta Hellstrom, Stockholm, Sweden, assignor to Aktiebolaget Elektrolux, Stockholm, Sweden, a corporation of Sweden Application February 26, 1948, Serial No. 11,015
In Sweden February 28, 1947

7 Claims. (Cl. 62—119.5)

My invention relates to refrigeration, and is especially concerned with absorption refrigeration systems of the kind employing an inert gas or pressure equalizing agent.

In refrigeration systems of this type liquid refrigerant conducted to an evaporator or cooling element evaporates and diffuses therein into an inert gas to produce a refrigerating effect. The inert gas enriched in refrigerant vapor flows in a gas circuit from the evaporator to an absorber in which refrigerant vapor is absorbed into an absorbent. Inert gas weak in refrigerant vapor flows in the gas circuit from the absorber back to the evaporator in a path of flow which desirably is in heat exchange relation with that of inert gas flowing to the absorber and rich in refrigerant vapor. The absorber forms part of an absorption liquid circuit which also includes a generator or vapor expulsion unit in which refrigerant is expelled from solution and passes into a place of liquefaction from which liquid refrigerant is conducted to the evaporator. Absorption solution deprived of and weak in refrigerant flows from the vapor expulsion unit to the absorber, and solution enriched in refrigerant flows from the absorber back to the vapor expulsion unit.

It is often desirable in such a refrigeration system to employ an evaporator or absorber having parallel paths of flow for the inert gas in order to reduce the resistance to gas flow therethrough, thereby improving the efficiency and capacity of the system. For example, in a gas circuit having an absorber connected for parallel flow of inert gas through several sections or parts thereof, it usually has been the practice heretofore to employ a liquid divider to subdivide absorption liquid flowing to the absorber into a plurality of streams, and to conduct the subdivided streams to the absorber sections in a desired manner. Liquid dividers generally have not been entirely satisfactory because of the difficulty encountered in practice in obtaining a definite division or splitting of absorption solution into a plurality of separate streams.

Broadly, it is an object of my invention to provide improved circulation of fluid in gas circuits of systems of the above-mentioned type having provisions for circulating inert gas in parallel paths of flow. More particularly, it is an object of the invention to provide improved circulation of inert gas and absorption liquid in an absorber having parallel paths of flow for inert gas. I accomplish this by conducting absorption liquid successively through a number of absorber sections, and flowing inert gas in parallel paths of flow through two such absorber sections and thereafter in a common path of flow through a third absorber section.

Figure 2:
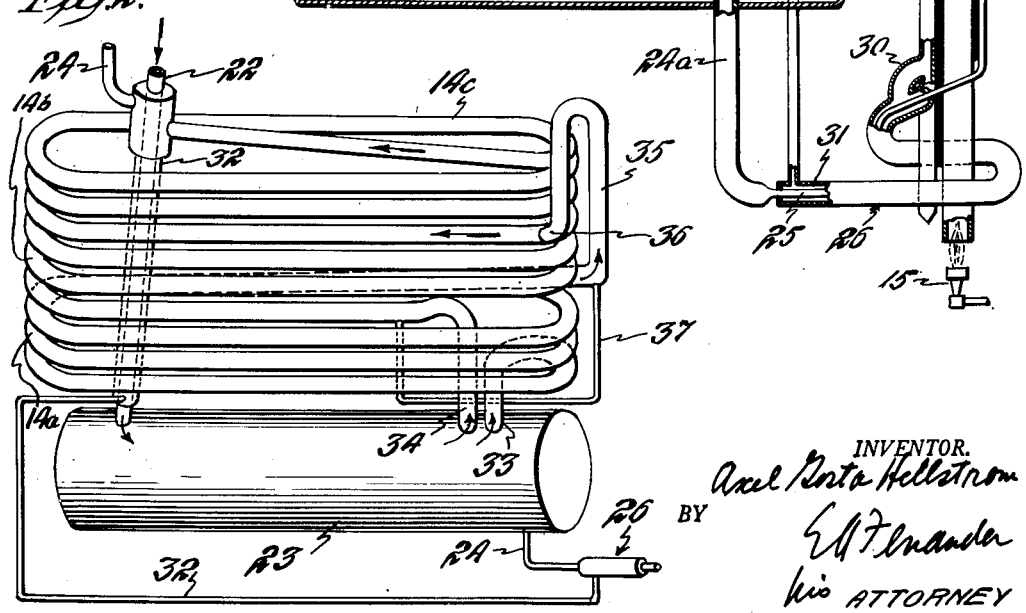

The invention, together with the above and other objects and advantages thereof, will be better understood from the following description and accompanying drawing forming a part of this specification, and of which Fig. 1 diagrammatically illustrates an absorption refrigeration system embodying my invention; and Fig. 2 is a view in elevation illustrating one practical form of parts diagrammatically shown in Fig. 1 to illustrate the invention more clearly.

In Fig. 1 I have shown the invention embodied in an absorption refrigeration system of a type employing a pressure equalizing agent. Such a system includes a vapor expulsion unit or generator 10, condenser 11, an evaporator or cooling element 12 and absorber structure 14 which are connected to one another in a manner well known in the art and which will be described briefly. The system contains a solution of refrigerant in absorption liquid, such as ammonia in water, for example, and also an auxiliary agent or inert gas, such as hydrogen.

The generator 10 is heated in any suitable manner, as by a gas burner 15, for example, whereby refrigerant vapor is expelled from solution therein. The refrigerant vapor flows upwardly through a standpipe 16 whose upper end is connected to the condenser 11 in which such vapor is liquefied. Liquid refrigerant flows from condenser 11 through a conduit 17 to the evaporator 12 in which such liquid evaporates and diffuses into the inert gas which enters from an inner passage 18 of a gas heat exchanger 19. Due to evaporation of refrigerant fluid into inert gas, a refrigerating effect is produced with consequent absorption of heat from the surroundings.

The rich gas mixture of inert gas and refrigerant vapor formed in evaporator 12 flows from the upper part thereof through a conduit 20, outer passage 21 of gas heat exchanger 19 and conduit 22 into the absorber structure 14 which includes a vessel 23. In the absorber structure 14 the rich gas mixture flows countercurrent to downwardly flowing weak absorption liquid, as will be described more fully hereinafter. The absorption liquid absorbs refrigerant vapor from the inert gas, and inert gas weak in refrigerant flows from absorber structure 14 through conduit 24 and inner passage 18 of gas heat exchanger 19 into the lower part of evaporator 12.

The circulation of gas in the gas circuit just described is due to the difference in specific weight of gases flowing to and leaving the evaporator 12 which are weak and rich, respectively, in refrigerant vapor. Since the column of gas rich in refrigerant vapor and flowing from evaporator 12 to absorber vessel 23 is heavier than that of gas weak in refrigerant vapor and flowing from absorber structure 14 back to the evaporator, a force is produced and developed within the system for causing circulation of inert gas in the manner described.

Absorption liquid enriched in refrigerant flows from the absorber vessel 23 through a conduit 24a and inner passage 25 of a liquid heat exchanger 26 to a vapor lift tube 27 which is heat conductively connected to a heating flue 28 heated by the burner 15. Liquid is raised by vapor-liquid lift action through tube 27 into the upper part of standpipe 16 which is also heat conductively connected to the heating flue 28. The refrigerant vapor expelled out of solution in generator 10 flows upwardly into condenser 11, as explained above. The outlet end of the condenser 11 is connected by a conduit 29 to the gas circuit, as to the absorber structure, for example, so that any inert gas which may pass through the condenser can flow into the gas circuit.

The absorption liquid from which refrigerant has been expelled flows from generator 10 through conduit 30, outer passage 31 of liquid heat exchanger 26 and conduit 32 whose upper end is connected to absorber structure 14. This circulation of absorption liquid results from the raising of liquid through vapor lift tube 27.

In accordance with my invention the absorber structure 14 comprises a plurality of sections 14a and 14b which are connected in parallel in the gas circuit and successively supplied with absorption liquid through the single conduit 32, thereby avoiding the necessity for splitting or subdividing absorption liquid into several streams. The parallel connection of absorber sections 14a and 14b will be readily apparent in Fig. 1 wherein the absorber vessel 23, into which inert gas rich in refrigerant flows through conduit 22, is connected at 33 to the lower end of absorber section 14a and connected by a conduit 34 to the lower end of absorber section 14b.

The upper end of absorber section 14a is connected by a conduit 35 to the upper end of absorber section 14b which communicates at 36 with the lower end of a third absorber section 14c whose upper end is connected to receive absorption liquid from conduit 32. It will be observed that conduits 34 and 35 are of inverted U-shape at their upper ends and are directed downwardly at the extreme ends thereof which join the lower and upper ends, respectively, of the absorber section 14b. The raised upper end portion of conduit 34 freely permits flow of inert gas therethrough while serving as a barrier to liquid flowing downwardly in absorber section 14b, the liquid being diverted from the lower end of this absorber section through a U-shaped conduit or trap 37 to the upper end of the absorber section 14a.

In the operation of the refrigeration system, inert gas rich in refrigerant vapor passes downwardly through conduit 22 into vessel 23. From the vessel 23 enriched inert gas passes in parallel paths of flow through absorber sections 14a and 14b, rich gas substantially at the same partial pressure of refrigerant vapor passing directly from the vessel to the absorber section 14a at 33 and to the absorber section 14b through the conduit 34. From the upper end of the absorber section 14a inert gas passes through conduit 35 and joins inert gas leaving the absorber section 14b, and all of the inert gas from the absorber sections 14a and 14b passes upwardly through a common or single path of flow in the absorber section 14c.

Absorption liquid weak in refrigerant enters the upper end of absorber section 14c through conduit 32 and passes successively through the absorber sections 14c, 14b and 14a, the trap 37 serving to direct all of the liquid from the lower end of absorber section 14b to the upper end of absorber section 14a. The absorption liquid passes downwardly by gravity flow in each of the absorber sections 14a, 14b and 14c in counterflow to upwardly flowing inert gas. Due to the intimate gas and liquid contact effected in the several absorber sections, vaporous refrigerant is absorbed into absorption liquid, and inert gas weak in refrigerant passes from the upper end of the absorber structure 14 into the conduit 24 through which such gas is conducted to the evaporator 12.

Since absorption liquid flows first through absorber section 14b and then through absorber section 14a, the absorption liquid in the absorber section 14a contains a greater amount of refrigerant in solution than that in absorber section 14b. Accordingly, the partial pressure of refrigerant vapor in the gas mixture passing from the absorber section 14a is not the same as that in the gas mixture passing from the absorber section 14b, at the region 36 at which these gas mixtures come together at the upper ends of the parallel flow paths. Hence, the uppermost absorber section 14c is desirably employed which provides a common path of flow for all of the inert gas in which the final or last stage of absorption of refrigerant vapor into absorbent is effected.

It will now be understood that the absorber sections 14c, 14b and 14a are serially connected together for downward flow of absorption liquid through successive absorber sections. In a practical embodiment of the invention the absorber section 14a and conduit 35 may be formed of a single length of piping, and the absorber sections 14c and 14b and conduit 34 may be formed of another single length of piping. Such a practical arrangement of the absorber structure 14 diagrammatically shown in Fig. 1 and just described is illustrated in Fig. 2 in which parts having a similar function and purpose are designated by the same reference numerals.

The portions of the piping serving as the absorber sections 14a, 14b and 14c may be shaped in suitable pipe bending equipment to form looped coils which are disposed one above the other when the piping and other parts are united together, as by welding, for example. In Fig. 2 it will be seen that a part of conduit 32, through which weak absorption liquid flows to the absorber structure, is disposed about and in heat exchange relation with the conduit 22 through which inert gas rich in refrigerant flows to the absorber vessel 23.

When installed in a household refrigerator cabinet, the evaporator 12 of the refrigeration system is arranged to cool a thermally insulated interior space of the cabinet, while other parts, such as the generator 10, condenser 11 and absorber structure 14, for example, may be positioned in a vertically extending apparatus space at the exterior of the cabinet. The condenser 11 is located in such apparatus space at a higher level than the absorber structure 14, and both of these parts are usually cooled by air coming in contact therewith, the circulation of which may be induced by natural draft. Accordingly, the condenser 11 may be provided with heat dissipating members 38. In certain instances the exterior surfaces of the piping forming the absorber sections 14a, 14b and 14c may provide adequate heat transfer surface to give up heat of absorption to air flowing in contact therewith. If desired, fins or heat transfer members (not shown) may be provided on one or more of the absorber sections 14a, 14b and 14c to obtain an adequate heat transfer surface when this becomes necessary in order to give up heat of absorption resulting from absorption of refrigerant vapor into absorbent in the absorber structure 14.

In view of the foregoing, it will now be understood that an improved absorber has been provided having several places of absorption through which inert gas is circulated in parallel paths of flow, such places of absorption being connected in series of flow of absorption liquid therethrough from one place to the next succeeding place of absorption. In this way the difficulty previously encountered in dividing absorption liquid into several streams for flow through different absorber sections connected in parallel is avoided, and a simple absorber structure is obtained which is inexpensive to construct, especially when the absorber sections are formed of piping in the manner explained above and shown in Fig. 2.

While I have shown and described a single embodiment of my invention, such variations and modifications are contemplated as fall within the true spirit and scope of the invention, as pointed out in the following claims.

What is claimed is:

1. In a method of refrigeration with the aid of a system having a circuit for inert gas including an evaporator and an absorber and provisions for introducing liquid refrigerant into the gas circuit for flow through the evaporator and introducing absorption liquid into the gas circuit for flow through the absorber, said circuit having first and second places through which inert gas is circulated in parallel paths of flow, the improvement which comprises introducing inert gas into said two places at substantially the same partial pressure of refrigerant vapor, flowing inert gas from said two places in a common path of flow through a third place, and flowing one of said liquids introduced into said circuit through said third place and from the latter through said two first-mentioned places in succession from one to another.

2. In a method of refrigeration with the aid of a system having a circuit for inert gas comprising interconnected parts including an evaporator and an absorber and provisions for introducing liquid refrigerant into the gas circuit for flow through the evaporator and introducing absorption liquid into the gas circuit for flow through the absorber, one of such parts having a plurality of places through at least two of which inert gas is circulated in parallel paths of flow, the improvement which comprises introducing inert gas into said two places at substantially the same partial pressure of refrigerant vapor, flowing inert gas from said two places in a common path of flow through another of said places, and flowing one of said liquids introduced into said one part first through said other place providing a common path of flow for inert gas and thereafter successively through said two places in which inert gas is circulated in parallel flow paths.

3. A refrigeration system comprising a gas circuit having a number of interconnected parts including an evaporator and absorber and means to deliver liquid refrigerant to said circuit for flow through the evaporator and deliver absorption liquid to said circuit for flow through the absorber, one of said parts having a plurality of sections connected for circulation of inert gas in parallel through at least two sections and thereafter in a common flow path through a third section, and means to conduct one of the liquids delivered to said one part serially through said sections, said two sections being arranged to receive liquid from said third section.

4. A refrigeration system including an absorber having a plurality of sections, means to conduct absorption liquid successively through a number of sections, and connections for circulation of inert gas in parallel paths of flow through at least two of said sections and therefrom in a common path of flow through a third section, said two sections being arranged to receive liquid from said third section.

5. A refrigeration system including an absorber comprising a vessel and a plurality of sections each providing an elongated path of fluid flow, said vessel being connected to receive inert gas rich in refrigerant vapor, the lower ends of at least two of said sections communicating with said vessel, means to conduct absorption liquid to said absorber, said two sectitons being connected for downward flow of absorption liquid therethrough in series and for upward flow of inert gas therethrough in parallel, and another absorber section connected for downward flow of absorption liquid prior to flowing through said two sections and for upward flow of inert gas from each of said sections connected in parallel for flow of such gas.

6. A refrigeration system including an absorber and connections for conducting thereto inert gas rich in refrigerant and absorption liquid weak in refrigerant, said absorber including a plurality of sections connected for flow of a single stream of absorption liquid therethrough and flow of inert gas therethrough in parallel, and an additional section connected for flow therethrough of absorption liquid in said stream prior to flowing through said first-mentioned sections and for flow therethrough of inert gas from said first-mentioned sections which are connected in parallel for flow of such gas.

7. In the art of refrigeration with the aid of a system having a circuit for inert gas including a place of evaporation in which refrigerant vaporizes in the presence of inert gas to form inert gas enriched in refrigerant which passes to a place of absorption, the improvement which comprises absorbing such vaporized refrigerant from inert gas into absorption solution at the place of absorption by subdividing the inert gas enriched in refrigerant into a plurality of paths of flow, flowing a single stream of absorption solution in contact with inert gas in said subdivided paths of flow, and, before inert gas from said subdivided paths of flow passes to the place of evaporation, reuniting such inert gas in a common path of flow, and flowing absorption solution in said stream in contact with inert gas in said common path of flow prior to passing through the subdivided paths of flow for inert gas.

AXEL GOSTA HELLSTROM.

REFERENCES CITED

The following references are of record in the file of this patent:

UNITED STATES PATENTS

| Number | Name | Date |
|---|---|---|
| 2,278,661 | Lenning et al. | Apr. 7, 1942 |

FOREIGN PATENTS

| Number | Country | Date |
|---|---|---|
| 335,199 | Great Britain | Sept. 17, 1930 |